No. 873,946.  
PATENTED DEC. 17, 1907.
J. VON DER KAMMER.  
COTTON SEED FOOD.  
APPLICATION FILED JUNE 20, 1906.
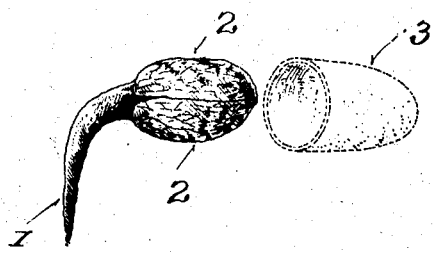
Witnesses
Inventor  
John von der Kammer.  
By Dyrenforth, Dyrenforth, Lee & Wiles  
Attorneys

UNITED STATES PATENT OFFICE.

JOHN VON DER KAMMER, OF PRAIRIE VIEW, ILLINOIS.

COTTON-SEED FOOD.

No. 873,946.  Specification of Letters Patent.  Patented Dec. 17, 1907.

Application filed June 20, 1906. Serial No. 322,536.

*To all whom it may concern:*

Be it known that I, JOHN VON DER KAMMER, a citizen of the United States, residing at Prairie View, in the county of Lake and State of Illinois, have invented a new and useful Improvement in Cotton-Seed Food, of which the following is a specification.

The object of my invention is to provide the seed of cotton plants in a form that will render it a palatable and highly nutritious food for man and animals.

Cotton-seed, though known to contain desirable food-elements, does not, in its normal condition of seed, afford, like grain and corn, a food. It is common to extract, in the form of oil, the fat contained in cotton-seed, and this oil is utilized as a supplement to other food; and the residue is converted into meal, which is quite commonly used as a supplement to stock-feed. As will readily be understood, by the treatments to which the seed is subjected for obtaining these products, the combined available food-elements contained therein are more or less separated or removed and lost, for the reason that the protein is thereby separated from the oil and the fat is separated from the protein, while it is the oil and protein which constitute the food-elements for man and stock.

I have discovered that cotton-seed transformed to the condition of germination is rendered a palatable and highly nutritious and healthful, because easily digestible, food, since by germinating the seed I avoid separation of its contained food-elements from the proper natural combined form required to adapt it for a food.

In the accompanying drawing illustrating a cotton seed which has been artificially sprouted, 1 designates the developed radical, and 2, 2 the plumuli, and 3 the hull which is shown as removed or separated from the seed.

To produce my new article of food, I germinate cotton-seed in any desired manner, but preferably in a suitable apparatus, such as that forming the subject of my Letters Patent No. 790,369, dated May 23, 1905, wherein it may be properly subjected to the action of moisture and suitable temperature, in a manner well understood and practiced in the art of germinating grains.

Under natural conditions the chemical changes which take place in the cotton seed are not uniform in a given quantity of the same during an equal period, this condition arising from unequal climatic conditions. Thus under natural conditions certain of the cotton seeds germinate more rapidly than others and the production of the plumules and radicals therefrom vary widely in the mass. The cotton seed sprouted under ordinary natural conditions is unfit for food, it being acrid and sour to the taste and otherwise unpalatable. I have found that the enzyme which is most active in the metabolism of the mass of cotton seed during germination is best developed at a temperature from 55 to 60° F. and produces an approximately uniform condition of sprouting of each unit or grain of seed making up the mass, and also produces the sweet nut-like flavor of the changed form of the oil in the seed, thus making it a palatable food. In my process the temperature and moisture are accurately and uniformly regulated, a condition not found in natural sprouting where material variations occur. I thus produce artificially sprouted cotton seed the growth of the plumules of which has been checked, and that of the radicals permitted to a degree short of natural root formation. I thus produce my new article of food in the form of sprouted cotton-seed by arresting the development of the seeds when they attain the condition in which their hulls are about half-way pushed off the seeds, when it is an easy matter to remove the hulls entirely. By reducing the temperature and cutting off the supply of moisture sufficiently to arrest germination the sprouting is checked at the proper condition of the seed. At this preferred stage of development, and with the hulls removed, the sprouted seed forms, in raw condition, a desirable food for man, having a refreshing nut-like taste and affording beneficial nutriment in cases of illness where starchy and saccharine foods are undesirable. Moreover, the article may, like green peas and string-beans, be provided in desirable commercial form, by subjecting it to the same preservative treatment as such vegetables are subjected to preparatory to canning them, and canning it for the market. Another form in which to provide my new article of food for use, is that of a powder, by drying and pulverizing it, to adapt it to be readily mixed with cereals and other food-forms.

For stock-food, it is not necessary to remove the hulls from the sprouted seed, which may be fed to the animals without any further preparation, but preferably as part of the grain-ration or in connection with their grazing-feed. This food has a remarkable salutary effect upon the digestive organs of live-stock and prevents scouring and fever in fattening stock for the market. Moreover, when my new article of food is fed to milch-cows for dairy purposes, it materially augments the solids and butter-fats of the milk; and it does not impart to the meat or to the milk any objectionable flavor.

What I claim as new, and desire to secure by Letters Patent, is—

1. As a new article of food, a mass of cotton-seed the grains of which are artificially-sprouted to a uniform condition and the sprouting arrested short of the growth of plumules thereon and a single radical developed on each grain.

2. As a new article of food, a mass of cotton-seed the grains of which are artificially-dehulled and sprouted to a uniform condition and the sprouting arrested short of the growth of plumules thereon and a single radical developed on each grain.

3. As a new article of food, dried and pulverized artificially-sprouted cotton-seed.

4. As a new article of food, a mass of dried artificially uniformly sprouted cotton-seed.

JOHN VON DER KAMMER.

In presence of—
A. U. THORIEN,
J. H. LANDES.